June 7, 1960  G. T. ROSHOLT  2,939,673
ELECTROMECHANICAL ELEMENTS
Filed Dec. 23, 1953  2 Sheets-Sheet 1

INVENTOR.
GORDON T. ROSHOLT
BY George H Fisher
ATTORNEY

June 7, 1960

G. T. ROSHOLT 2,939,673

ELECTROMECHANICAL ELEMENTS

Filed Dec. 23, 1953

INVENTOR.
GORDON T. ROSHOLT

BY George H Fisher

ATTORNEY

United States Patent Office 2,939,673
Patented June 7, 1960

2,939,673

ELECTROMECHANICAL ELEMENTS

Gordon T. Rosholt, Minneapolis, Minn., assignor to Minneapolis-Honeywell Regulator Company, Minneapolis, Minn., a corporation of Delaware Filed Dec. 23, 1953, Ser. No. 399,882

2 Claims. (Cl. 251—139)

This invention pertains to flexible enclosures containing a magnetic fluid. The enclosures are made out of a deformable material which in some embodiments may also be elastic. The utility of this invention lies in the fact that the shape and/or rigidity of the enclosure may be changed by the application thereto of a magnetic field or by changes in the intensity of an applied magnetic field, the change of shape and/or rigidity serving a plurality of purposes depending upon the particular application.

It is therefore an object of this invention to provide an electromechanical element comprising a deformable enclosure or capsule containing a magnetic fluid or a magnetic powder, the element becoming deformed and/or altered in rigidity upon the passage of magnetic flux therethrough.

Another object of the invention is to provide in an electromechanical element comprising a deformable enclosure a magnetic medium that is subject to deformation and which has inherent lubricating qualities which preclude wear between the magnetic medium and the enclosure containing the same.

These and other objects of the invention will become apparent from a reading of the appended specification and accompanying drawings wherein.

Figure 1:
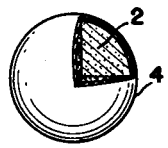
Figure 1 through Figure 5 are illustrations of the various forms and shapes which the electromechanical element may take depending upon the application.

Referring to the drawings, Figures 1 through 5 show representative examples of the shapes and forms that the electromechanical elements used in this invention may take, the invention, however, is not limited to the exact embodiments shown herein. In all cases the electromechanical elements comprise a deformable enclosure containing a magnetic fluid 2. The deformable enclosure in Figure 1 has the shape of a sphere 4, in Figure 2 the shape of a cylinder 6, in Figure 3 the shape of a disc 8, in Figure 4 the shape of a toroid or doughnut 10, and in Figure 5 the shape of a rectangular bar 12. In all cases the deformable enclosure members 4, 6, 8, 10 and 12 are to be constructed out of a thin, flexible, and usually elastic material such as rubber or other suitable substance. In some embodiments of the invention it is necessary that the enclosure member 10 be made out of an elastic material and in others it is not. However, it is to be understood that where it is necessary for the enclosure members to be made out of an elastic material, it will be appreciated that the elastic properties thereof may result either from an inherent property of the material itself as would be the case with rubber or from a mechanical resilient member acting upon the enclosure. An example of the latter case would be a resilient spring positioned in relation to the enclosure member so that it tends to maintain the enclosure member in a normal configuration.

The magnetic fluid 2 which fills the deformable enclosures preferably comprises a mixture of ferromagnetic particles such as finely divided iron powder and a lubricant such as oil or powdered graphite. Although the electromechanical elements will function when the enclosure members contain only ferromagnetic particles, it is preferred to use a mixture of ferromagnetic particles and a lubricant so as to form a magnetic fluid. One reason for this is that by using a lubricant, whether of the fluid type or of the dry type, the lubricant tends to minimize the wearing of the enclosure by the magnetic particles.

Figure 6:
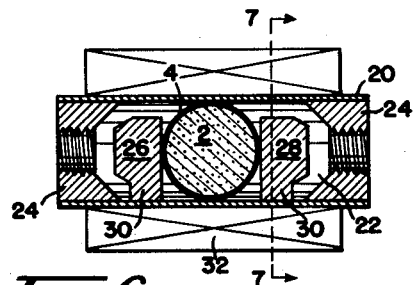
Figure 6 is a side elevational view in section of a valve embodying the teaching of the invention and utilizing a spherical electromechancal element such as of the type shown in Figure 1.
Figure 7:
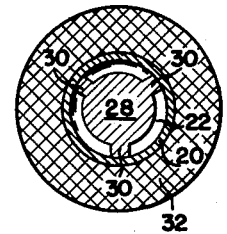
Figure 7 is a cross-sectional view of the valve shown in Figure 6 taken along section lines 7—7.
Figure 8:
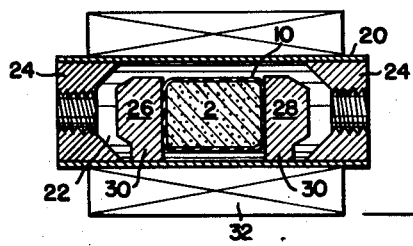
Figure 8 is a side-elevational view in section of the valve shown in Figure 6 with the coil member energized so as to deform the electromechanical elements.

Figures 6 through 8 show a valve wherein the deformable properties of the electromechanical elements are utilized. The valve comprises a nonmagnetic pipe or conduit member 20 having a passageway 22 therethrough. Each end of the pipe or conduit member 20 is provided with an internally threaded end plug 24 so as to provide a means of connecting the valve to additional piping, not shown.

Positioned in passageway 22 and spaced from one another are a pair of electromagnetic core members 26 and 28 which are made out of a ferromagnetic material such as a highly permeable type of iron. Core members 26 and 28 are positioned with respect to the conduit member 20 and retained in place by a plurality of fin members 30 which may be magnetic or nonmagnetic and which connect the core members to the inside wall of the conduit 20. The fin members 30 are proportioned so as to provide sufficient mechanical support for the core members 26 and 28 but do not offer any appreciable reduction in the cross-sectional area of passageway 22. It is to be noted that the cross-sectional area of core members 26 and 28 is substantially less than the cross-sectional area of the passageway 22 and further that core members 26 and 28 are symmetrically located with respect to the conduit member 20.

A spherical shaped electromechanical element such as the sphere 4 shown in Figure 1 and containing magnetic fluid 2 is positioned in passageway 22 intermediate core members 26 and 28. The design of the valve is such that the normal spherical configuration of the deformable enclosure 4 normally completely obstructs the passageway 22. Further, the core members 26 and 28 are spaced apart a distance approximately equal to the diameter of the spherical member 4.

A coil member 32 surrounds the exterior of conduit member 20 in the proximity of core members 26 and 28 and the enclosure 4 filled with the magnetic fluid 2.

As long as coil member 32 is deenergized, the enclosure member 4 will retain its normal configuration of a sphere so as to obstruct the passageway 22. Upon the energization of coil member 32, magnetic flux will flow through the interior of the coil and thus through passageway 22 and according to the laws of magnetics will follow through the path of least reluctance. Consequently, the flux will tend to flow through core members 26 and 28 and enclosure member 4. Due to the fact that core members 26 and 28 have a cross-sectional area less than the cross-sectional area of passageway 22, the flux flowing from one core member to the other will be concentrated along that reduced cross section. The effect of this on the enclosure member 4 filled with the magnetic fluid 2 will be to deform the same so that it more or less corresponds to the flow of flux between the core members 26 and 28 and in doing so becomes rigidly deformed to a shape similar to that shown in Figure 8. The deformation of enclosure member 4 reduces the transverse cross-sectional area of the same so as to cause it no longer to completely obstruct a passageway 22 but to allow the flow of fluid, not shown, through the passageway. Enclosure member 4 will remain in this abnormal and rigid configuration as long as coil member 32 remains energized. Upon the deenergization of coil member 32, enclosure member 4 will, due to either its natural elastic property or due to some other resilient means not shown, regain its normal spherical configuration, and thus once again completely obstruct the passageway 22.

Figure 3:
Figure 9:
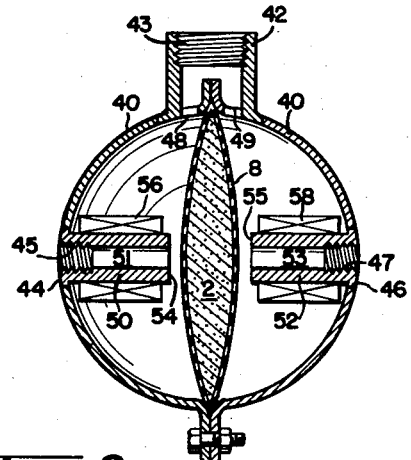
Figure 9 is a view in section of another type of valve that utilizes the teaching of the invention and comprises in part a disc type electromechanical element such as of the type shown in Figure 3.

Figure 9 shows a three-way or mixing valve having a valve body having inlet port 42 and two outlet ports 44 and 46. The ports 42, 44, and 46 are respectively internally threaded at 43, 45 and 47. The valve body generally is in a shape of a hollow sphere, preferably being fashioned out of two hollow hemispherical members 40 which when abutted one against the other form the hollow sphere. Positioned between the two hemispherical members is a disc type electromechanical element 8 filled with a magnetic fluid 2 such as shown in Figure 3. The electromechanical element 8 is adapted to be engaged around its entire periphery by the cooperating flanged surfaces of the hemispherical valve body members 40. The inlet port 42 is positioned in the side of the valve body at the junction of the two hemispherical elements 40 and is in communication by virtue of apertures 48 and 49 with the interior of the valve body and on both sides of the electromechanical element 8.

In connection with each of the outlet ports 44 and 46 are a pair of conduit members 50 and 52 made out of magnetic material and having respectively passageways 51 and 53 therein and inner faces 54 and 55 which are spaced somewhat from the exterior surface of deformable enclosure member 8. Surrounding each of the core members 50 and 52 are coil members 56 and 58 which are adapted to be energized by means not shown.

When coil members 56 and 58 are deenergized, the fluid pressure within valve body 40 is equal on both sides of enclosure member 8 and fluid will flow from the source, not shown, through inlet 42, apertures 48 and 49, into the valve body and thence out through passageways 51 and 53 in the outlet ports 44 and 46 respectively. When one of the coils is energized, for example coil 56, magnetic flux will tend to flow through core member 50 and also through a portion of the magnetic fluid 2 contained within the deformable enclosure member 8. The action of the flux upon enclosure member 8 will be to displace the same to the left from the position as shown in Figure 9 so that the side surface of the deformable enclosure member 8 abuts against the end surface 54 of core member 50 thus sealing off passageway 51 and preventing the flow of fluid therethrough. Deenergization of coil 56 will release the enclosure member 8 and allow it to regain its normal position as shown in the drawing. Similarly, energization of coil 58 will result in the deformable enclosure member 8 to be displaced to the right sealing off passageway 53.

Figure 2:
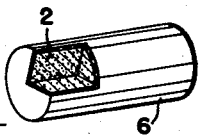
Figure 5:
Figure 10:
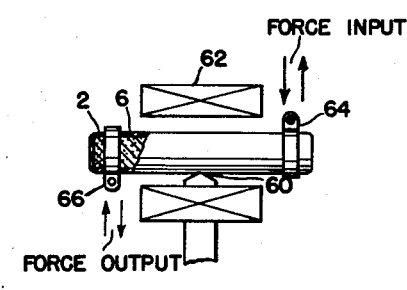
Figure 10 is a view partly in section of a device utilizing an electromechanical element such as the types shown in Figures 2 and 5 and which utilizes the fact that the rigidity of the electromechanical elements may be altered by the passage therethrough of electromagnetic flux.

Figure 10 shows how the change in rigidity of the deformable enclosure members may be utilized wherein a deformable enclosure member 6 containing a magnetic fluid 2 and having an elongated shape similar to the type of enclosures shown in Figure 2 or Figure 5 is adapted to be pivoted near its mid-point on a pivot member 60. A coil member 62 circumscribes the enclosure member 6 and is adapted to be energized from a source of power not shown. A mechanical force is adapted to be applied either upwardly or downwardly to the right extremity 64 of enclosure member 6. When coil 62 is deenergized, enclosure member 6 has a normal yieldable condition that gives it a rather limp character. Consequently, when force is applied to the right extremity 64 of enclosure member 6 while coil member 62 is deenergized, the motion imparted to right extremity of enclosure member 6 will not be transmitted to the left extremity 66 of the element due to the fact that it is in a limp state. As a result, no motion will be produced at the left extremity 66 of the element. However, when coil 62 is energized the deformable enclosure member 6 will attain a state of rigidity, the degree of rigidity depending upon the amount of energization of coil member 62. The element 6, now being rigid, will become like a lever member so as to transmit the force applied to the right extremity 64 as an output force from the left extremity 66.

Figure 4:
Figure 11:
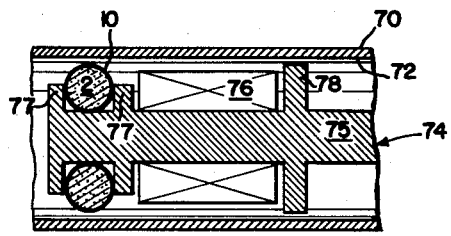
Figure 11 is a side-elevational view in section of a device comprising in part a toroid type of electromechanical element such as the type shown in Figure 4.
Figure 12:
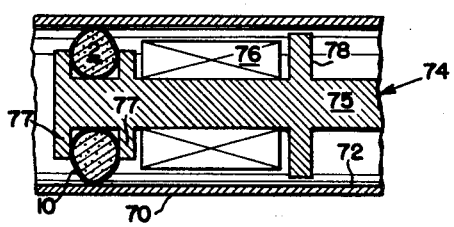
Figure 12 is a side-elevational view in section of the device shown in Figure 11 with the coil member energized.

Figures 11 and 12 show a toroid or doughnut type of deformable element 10 such as is shown in Figure 4 used in a device as a piston ring and/or valve. The entire device comprises a cylinder member 70 having an inner passageway 72 of appreciable cross-sectional area. Positioned within the cylinder member 70 is a piston member 74 having a connection rod 75. Positioned on piston member 74 are a coil member 76 adapted to be energized by means not shown and the deformable enclosure member 10 circumscribing the extremity of the piston member and being retained in place by a pair of shoulder members 77. An additional shoulder member 78 is integral with the piston member 74 and is part of a magnetic circuit for the flux produced by coil member 76 when energized that includes cylinder member 70, magnetic fluid 2 within the enclosure member 10, shoulder 77 and that portion of piston rod 75 joining shoulders 77 and shoulder 78.

When coil 76 is deenergized, the piston assembly including enclosure member 10 fits comparatively loosely within cylinder member 70 and thus does not completely obstruct passageway 72. However, when coil 76 is energized, the magnetic flux flowing along the magnetic path, above described, causes the enclosure member 10 to become enlongated along its outer periphery so as to cause enclosure member 10 to seal off passageway 72. Enclosure member 10 becomes elongated because the magnetic fluid 2 within enclosure member 10 will tend to align itself with the lines of flux flowing between cylinder member 70 and piston rod 75 in the proximity of shoulder members 77.

While I have illustrated the preferred embodiments of my invention, it is obvious that many other modifications or adaptations of this electromechanical element will occur to those skilled in the art, therefore, it should be clearly understood that the invention is to be limited only by the scope of the appendant claims.

What I claim is:

1. Apparatus of the class described comprising a member having a passageway therethrough; electromagnetic core means secured to the sides of said passageway, said core means partially obstructing said passageway; a hollow deformable enclosure positioned in said passageway and between said core means, said enclosure containing a quantity of ferromagnetic particles and having a normal configuration so as to entirely obstruct said passageway; electromagnetic coil means circumscribing said member in the proximity of said enclosure and said core means;

and means for energizing said coil means, said enclosure being deformed from said normal configuration upon the energization of said coil means so as to only partially obstruct said passageway.

2. Apparatus of the class described comprising a member having a passageway therethrough; electromagnetic core means positioned in said passageway, said core means partially obstructing said passageway; a hollow deformable enclosure positioned in said passageway and between said core means, said enclosure containing a quantity of ferromagnetic particles and a liquid lubricant and having a normal configuration so as to entirely obstruct said passageway; electromagnetic coil means in magnetic proximity with said enclosure and said core means; means for energizing said coil means, said enclosure being deformed from said normal configuration upon the energization of said coil means so as to only partially obstruct said passageway; and means for causing said enclosure to regain its normal configuration upon the deenergization of said coil means.

References Cited in the file of this patent

UNITED STATES PATENTS

| | | |
|---|---|---|
| 755,734 | Barrow | Mar. 29, 1904 |
| 1,494,070 | MacKnight | May 13, 1924 |
| 1,873,138 | Mitchell | Aug. 23, 1932 |
| 1,902,027 | Henkel | Mar. 21, 1933 |
| 2,056,322 | Hoppe | Oct. 6, 1936 |
| 2,237,719 | Tiebel | Apr. 8, 1941 |
| 2,278,532 | Crickmer | Apr. 7, 1942 |
| 2,532,876 | Asche | Dec. 5, 1950 |
| 2,543,010 | Gardner | Feb. 27, 1951 |
| 2,662,550 | Meyer | Dec. 15, 1953 |
| 2,792,536 | Immel | May 14, 1957 |

FOREIGN PATENTS

| | | |
|---|---|---|
| 258,092 | Switzerland | Apr. 16, 1949 |
| 986,047 | France | Mar. 21, 1951 |